United States Patent [19]

Belanger et al.

[11] Patent Number: 5,039,932
[45] Date of Patent: Aug. 13, 1991

[54] INTEGRATED VARIABLE RELUCTANCE GENERATOR FOR AIR FRAMES

[75] Inventors: David J. Belanger; Jayant Vaidya, both of Rockford, Ill.

[73] Assignee: Sundstrand Corporation, Rockford, Ill.

[21] Appl. No.: 391,194

[22] Filed: Aug. 9, 1989

[51] Int. Cl.$^5$ .............................................. H02P 9/14
[52] U.S. Cl. ..................................... 322/32; 322/29; 310/113
[58] Field of Search ................... 322/29, 32; 310/168, 310/112, 113, 114; 290/4 R, 38 R

[56] References Cited

U.S. PATENT DOCUMENTS

| | | | |
|---|---|---|---|
| 3,062,979 | 11/1962 | Jarret et al. | |
| 3,467,844 | 9/1969 | Bird | |
| 4,246,531 | 1/1981 | Jordan | 322/32 X |
| 4,400,659 | 8/1983 | Barron et al. | 322/32 |
| 4,401,939 | 8/1983 | Korbell | 322/59 |
| 4,625,160 | 11/1986 | Hucker | 322/32 |
| 4,639,626 | 1/1987 | McGee | 310/168 |
| 4,806,841 | 2/1989 | Lee et al. | 322/32 X |
| 4,868,406 | 9/1989 | Glennon et al. | 322/29 X |
| 4,959,605 | 9/1990 | Vaidya et al. | 310/168 X |

Primary Examiner—Steven L. Stephan
Assistant Examiner—Kristine Peckman
Attorney, Agent, or Firm—Antonelli, Terry, Stout & Kraus

[57] ABSTRACT

An alternating current generating system (40) for an air frame producing an output potential in accordance with the invention includes a generator (42) for generating current having a rotor (46) mounted on a shaft (50) which is rotatably driven and a stator (58) from which current is outputted; a variable reluctance generator (44) for generating alternating current outputted from a stator (62) and having a rotor (48) mounted on the shaft to cause alternating current to be generated by the stator and a voltage regulator (84), coupled to the generator for generating current, to an output of (88) of the variable reluctance generator and to an excitation winding (86) of the variable reluctance generator, for producing excitation current applied to the stator of the variable reluctance generator to regulate the voltage outputted by the variable reluctance generator.

25 Claims, 5 Drawing Sheets

INTEGRATED VARIABLE RELUCTANCE
GENERATOR FOR AIR FRAMES

TECHNICAL FIELD

The present invention relates to electrical power generators for air frames.

BACKGROUND ART

FIG. 1 illustrates a prior art integrated drive generator air frame power generating system 10 of a type manufactured by the assignee of the present invention for generating three-phase 400 Hz. 120 volt alternating current. The integrated drive generator 10 is driven by a power takeoff 12 from an air frame propulsion engine which varies in speed during operation of the air frame. The power takeoff 12 is coupled to a constant speed drive transmission 14 which functions to produce a constant speed output on shaft 16 while the rotational speed of the power takeoff varies. It should be understood that the construction of the constant speed drive transmission 14 is conventional. Furthermore, the connection of the constant speed drive transmission 14 to the shaft 16 is illustrated only schematically. The integrated drive generator 10 has a permanent magnet generator 18, wound field exciter 20, and main generator 22 each of a conventional construction, having rotors mounted on shaft 16 which is supported by bearings (not illustrated) which are mounted in a housing (not illustrated) of the integrated drive generator. Permanent magnet generator 18 has a permanent magnet rotor 24 mounted on the shaft 16. The stator 26 of the permanent magnet generator 18 outputs alternating current which is rectified by rectifier 28 to produce field excitation current which is applied to the stator 30 of the wound field exciter 20. The rotor 32 of the wound field exciter 20, mounted on shaft 16, outputs alternating current which is rectified by rectifier 34. Rectified current from rectifier 34 is applied to the field windings of the rotor 36 of the main generator 22 to control the output of the main generator. The stator 38 outputs three-phase 400 Hz. 120 volt alternating current for use in powering the various electrical loads on the air frame.

The weight and size of an electrical power generating system is of extreme importance in the design of air frames. Unnecessary weight lessens the overall efficiency of the air frame and its load carrying capability. Increased size in an electrical power generating system can interfere with the mounting of the generator on the propulsion engine when the generator is in the form of an integrated drive generator as a consequence of interference between the integrated drive generator and the cowling of the engine. Shortening of the overall length of the housing of an electrical power generating system with respect to the length of the drive shaft 16 is important in reducing weight, facilitating mounting of the integrated drive generator with respect to the engine cowling and reducing overhung moment which lessens the requirement for reinforcing of the mounting flange on the engine where the integrated drive generator is attached.

Alternative configurations of the electrical power generating system of FIG. 1 exist in which the permanent magnet generator is mounted on a second shaft which results in shortening the overall length of the case containing the generator.

The electrical power generating system of FIG. 1 is operated as a synchronous machine. The main generator 22 has a wound rotor which limits the operating speed of the generator as a consequence of the rotor requiring reinforcement to support the windings on the rotor. Furthermore, the wound field exciter 20 also has a wound rotor having the same attendant disadvantages as the wound rotor in the main generator 22. Finally, the rectifier bridge 34, which rectifies the output current from the wound field exciter 20 and rotates at the velocity of the shaft 16, represents an additional reliability and weight penalty.

Variable reluctance power generators are well known. An example of a variable reluctance power generator is disclosed in U.S. Pat. No. 3,062,979.

DISCLOSURE OF THE INVENTION

The present invention provides an improved electrical power generating system for an air frame. The invention is applicable to systems utilizing constant speed drive transmissions to produce frequency regulated output alternating current and to variable speed constant frequency (VSCF) systems and to DC power generating systems. The present invention utilizes a permanent magnet generator for generating excitation current for the excitation winding of a variable reluctance generator which is located on the stator of the variable reluctance generator. This configuration eliminates the wound field exciter 20 described above with reference to the prior art with an attendant weight savings. Furthermore, the variable reluctance generator has no rotor windings and therefore does not have the speed limitation associated with the wound rotor synchronous generator 22 of the prior art. Operation of the variable reluctance generator at a higher rotational velocity than the synchronous generator 22 of FIG. 1, permits the weight of the generator to be reduced while outputting the same amount of electrical power. The combination of the permanent magnet generator and the variable reluctance generator satisfies the requirement that airframe power generating systems have no external power source for excitation. In addition to eliminating the wound field exciter 20, the rectifier bridge 34 of the prior art of FIG. 1 is eliminated with a reliability and weight savings.

The present invention has additional advantages over the prior art generating system of FIG. 1. While the permanent magnet generator of the present invention may be slightly larger than the permanent magnet generator 18 of FIG. 1, the overall weight is less as a consequence of the elimination of the wound field exciter 20 and the rectifier bridge 34. The combination of the permanent magnet generator and variable reluctance generator achieves weight and space savings over the prior art illustrated in FIG. 1. By removing the wound field exciter 20 and rectifier bridge 34, the overall length of the case when the present invention is utilized in an integrated drive generator is axially reduced which lessens the overhung moment of the power generating system of the present invention when attached to mounting flange on an air frame propulsion engine. Additionally, the rotor and stator design of a variable reluctance generator is simpler than the rotor and stator design of a synchronous main generator 20 as in the prior art. With a variable reluctance generator, concentric windings may be utilized within the field of the variable reluctance generator which are simpler and easier to manufacture than distributed windings.

An airframe electrical generating system for an air frame for producing an output potential in accordance with the invention includes an excitation having a rotor mounted on a shaft which is rotatably driven and a stator from which current is outputted; a variable reluctance generator having a stator and a rotor mounted on the shaft which is rotatably driven to cause current at the output potential to be generated by the stator of the variable reluctance generator; and a voltage regulator, coupled to the excitation generator current, to the output potential and to an excitation winding of the variable reluctance generator for producing excitation current applied to the stator of the variable reluctance generator to regulate the voltage outputted by the variable reluctance generator. The variable reluctance generator has a plurality of phases with the variable reluctance generator producing multiple phase alternating current. The invention further includes a constant speed drive transmission having an input coupled to an air frame propulsion engine and an output which provides a constant speed drive to the shaft independent of variation in velocity of the input of the constant speed drive transmission. A variable reluctance generator may have three phases and produce three phase alternating current having a frequency of 400 Hz.

The present invention is also applicable to VSCF systems. The invention as applied to VSCF systems further includes a power take off having an input coupled to an air frame propulsion engine and an output which drives the shaft which is rotatably driven; a full wave rectifier coupled to the multiple phase alternating current produced by the variable reluctance generator for producing a rectified DC voltage; and an inverter having a DC input coupled to the rectified DC voltage for producing a multiple phase alternating current on an output having a constant frequency.

Preferably, the excitation generator for generating excitation current is a permanent magnet generator. A rectifier is provided having an input, coupled to the stator of the permanent magnet generator, for generating current and an output coupled to the voltage regulator, for producing rectified current applied to the voltage regulator.

An airframe electrical generating system for producing a DC output potential in accordance with the invention includes an excitation having a rotor mounted on a shaft which is rotatably driven and a stator from which current is outputted; a variable reluctance generator having a rotor mounted on the shaft which is rotatably driven to cause alternating current to be generated by a stator of the variable reluctance generator; a voltage regulator, coupled to the excitation generator for generating current, to the DC output potential, and to an excitation winding of the variable reluctance generator, for producing excitation current applied to a stator of the variable reluctance generator to regulate the DC output potential; and a full wave rectifier, coupled to the alternating current outputted from the stator, to produce the DC output potential.

BEST MODE FOR CARRYING OUT THE INVENTION

Figure 1:
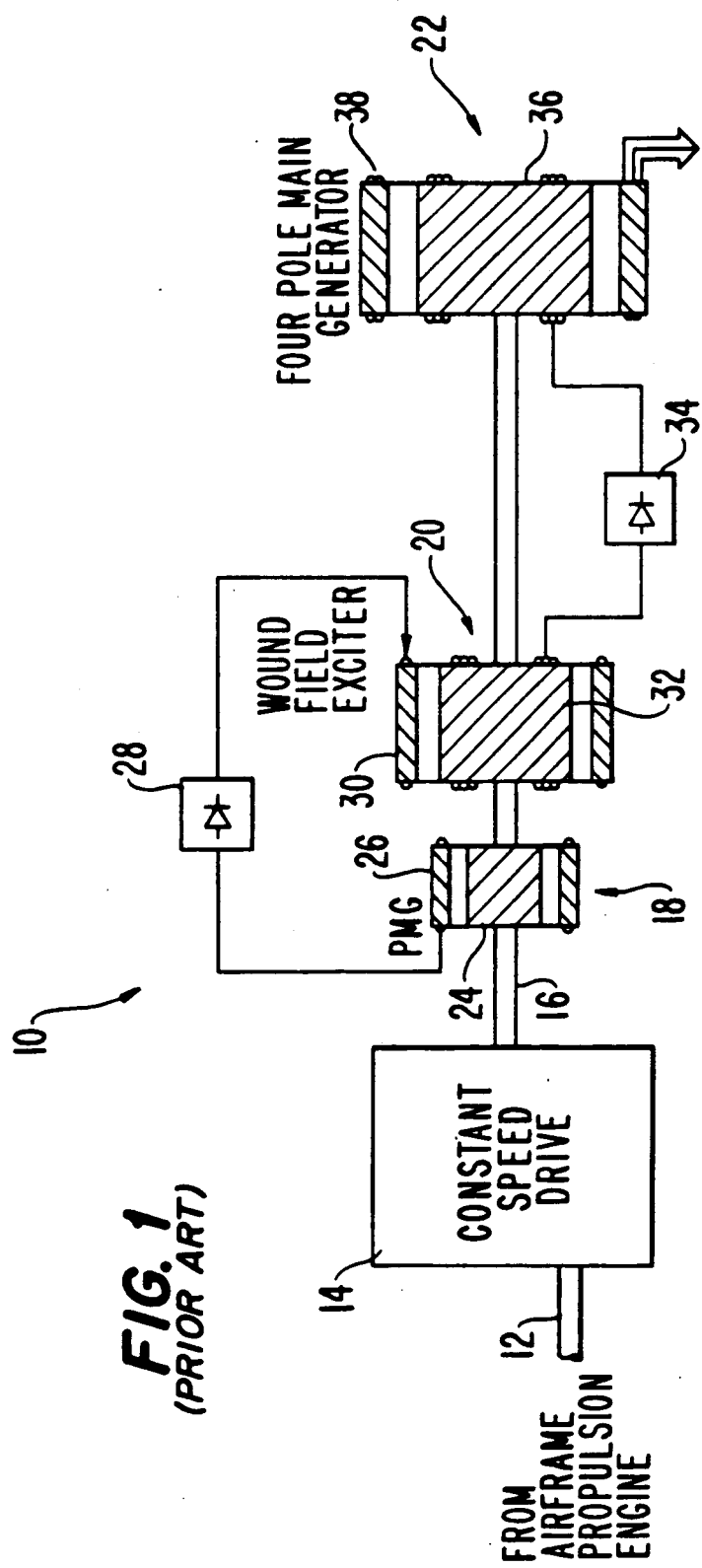
FIG. 1 illustrates a prior art electrical power generating system of the type manufactured by the assignee of the present invention.
Figure 2:
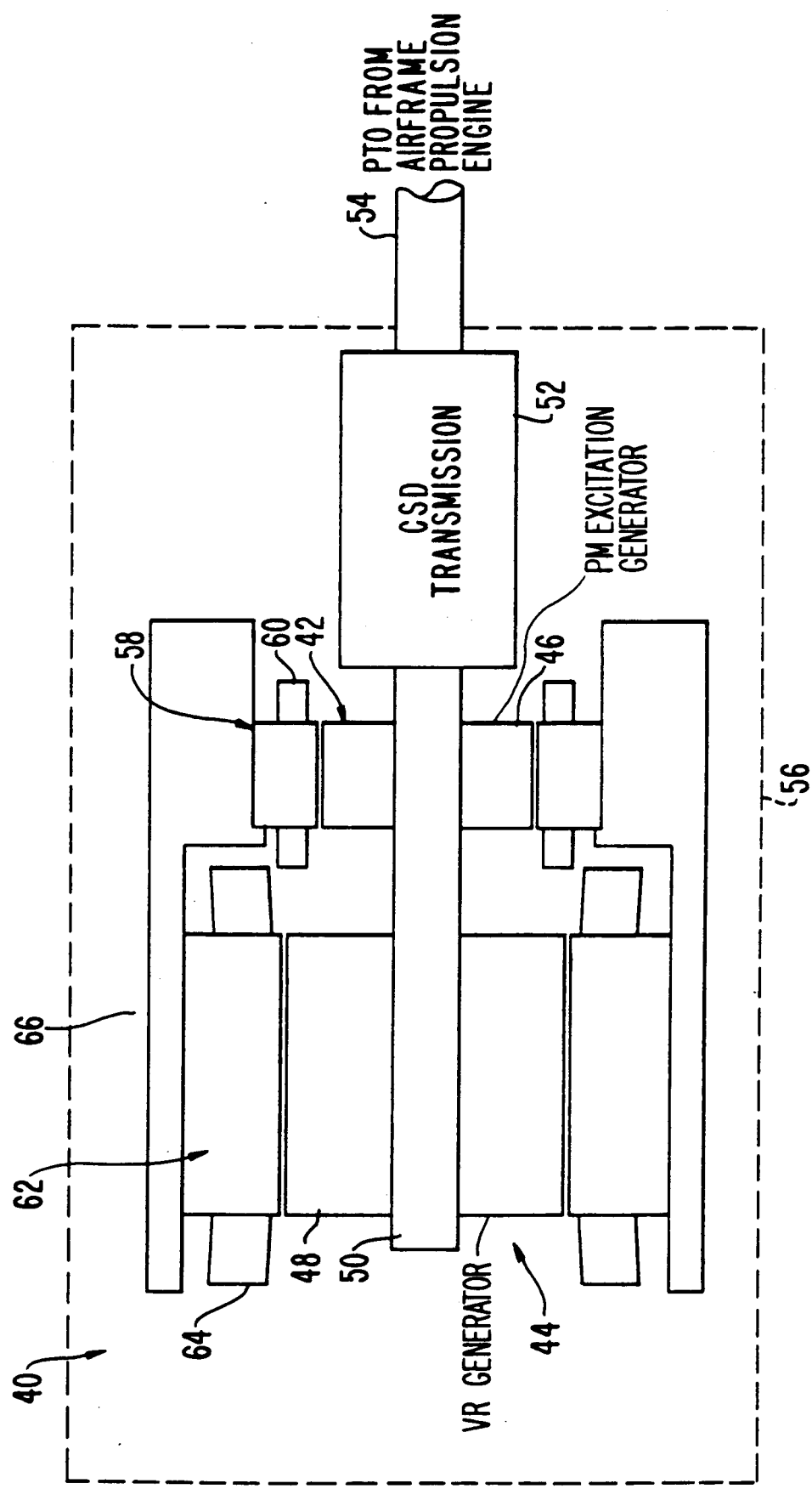
FIG. 2 illustrates a variable reluctance power generating system in accordance with the present invention for use in an air frame.
Figure 3:
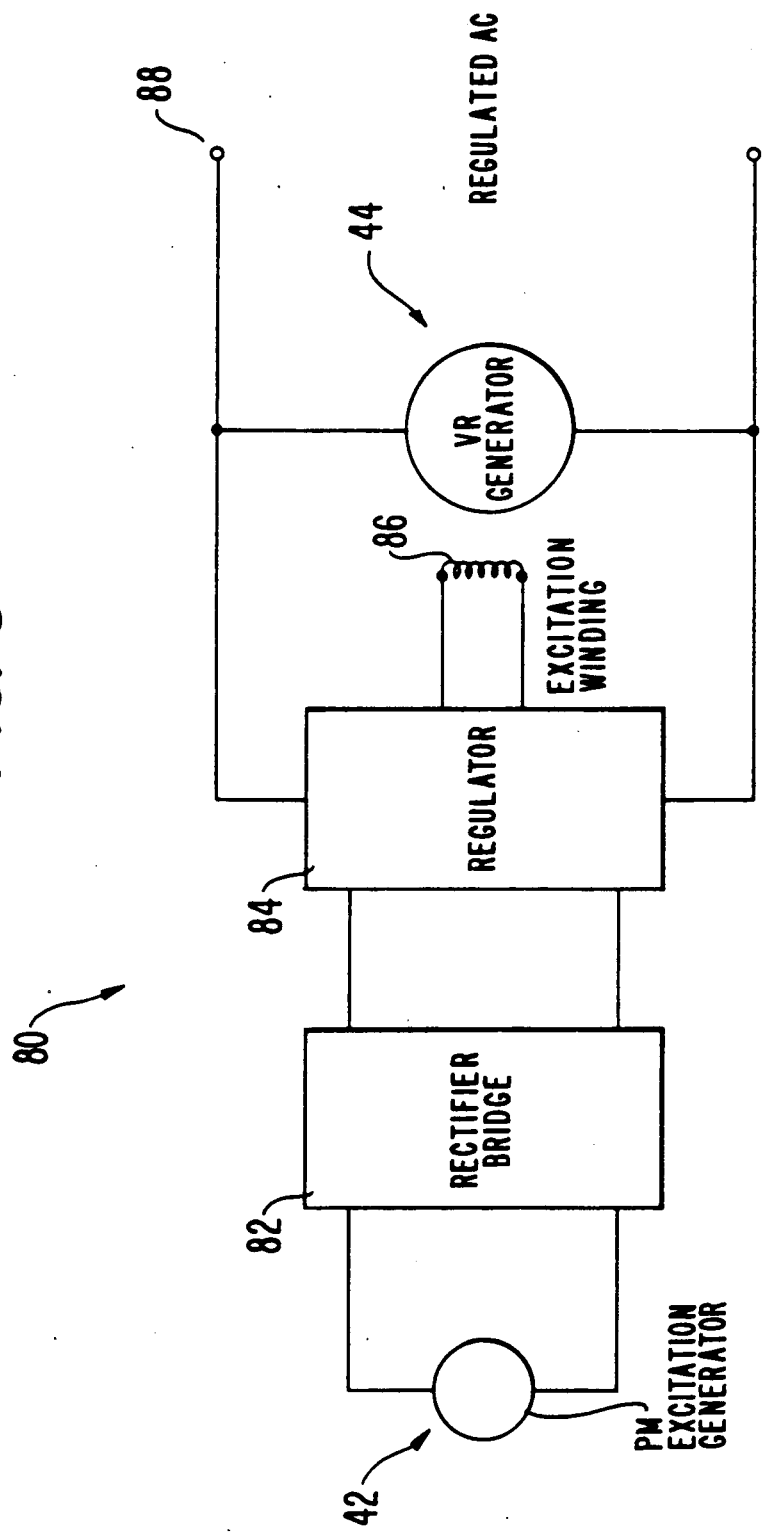
FIG. 3 illustrates a block diagram of a first embodiment of the present invention.
Figure 4:
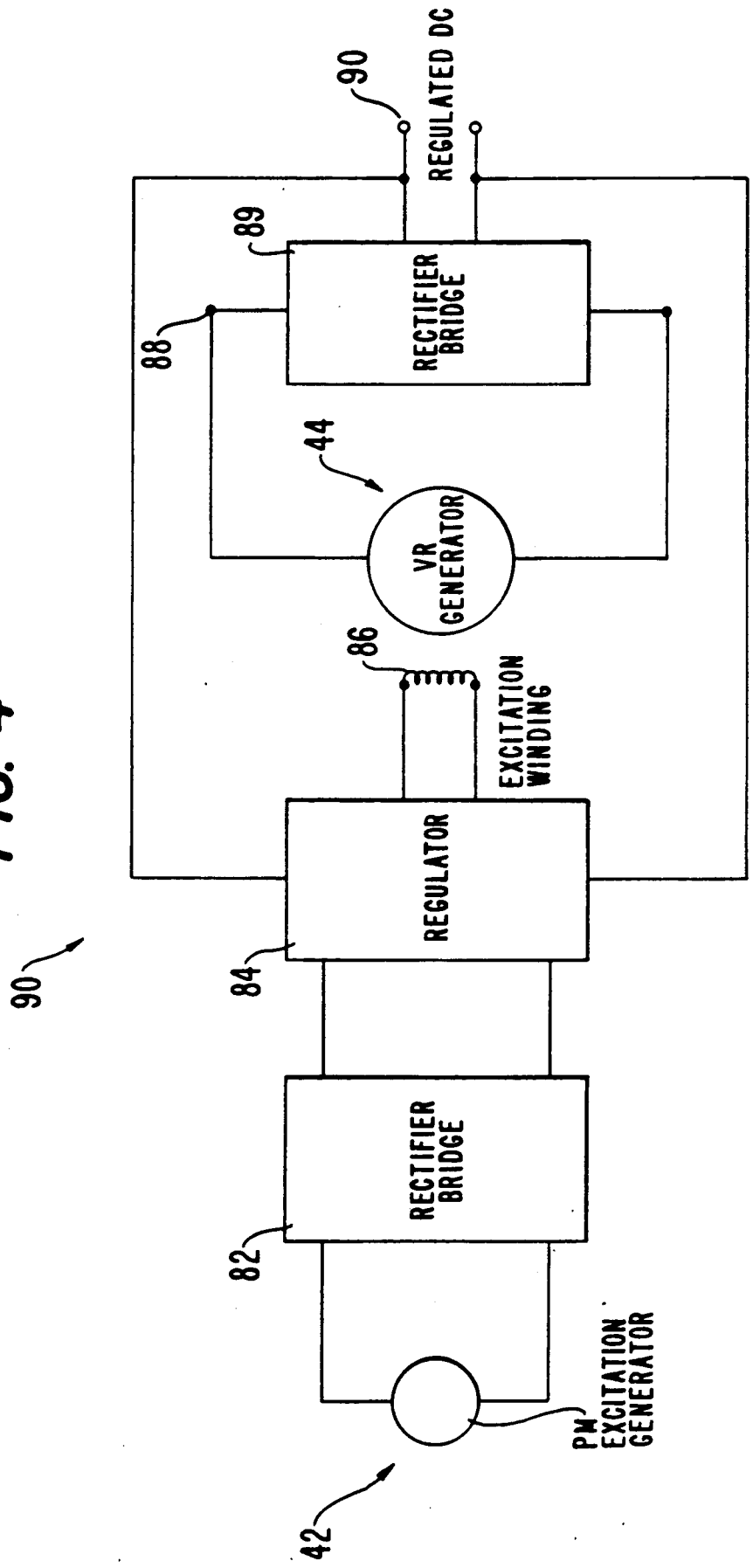
FIG. 4 illustrates a block diagram of a second embodiment of the present invention.
Figure 5:
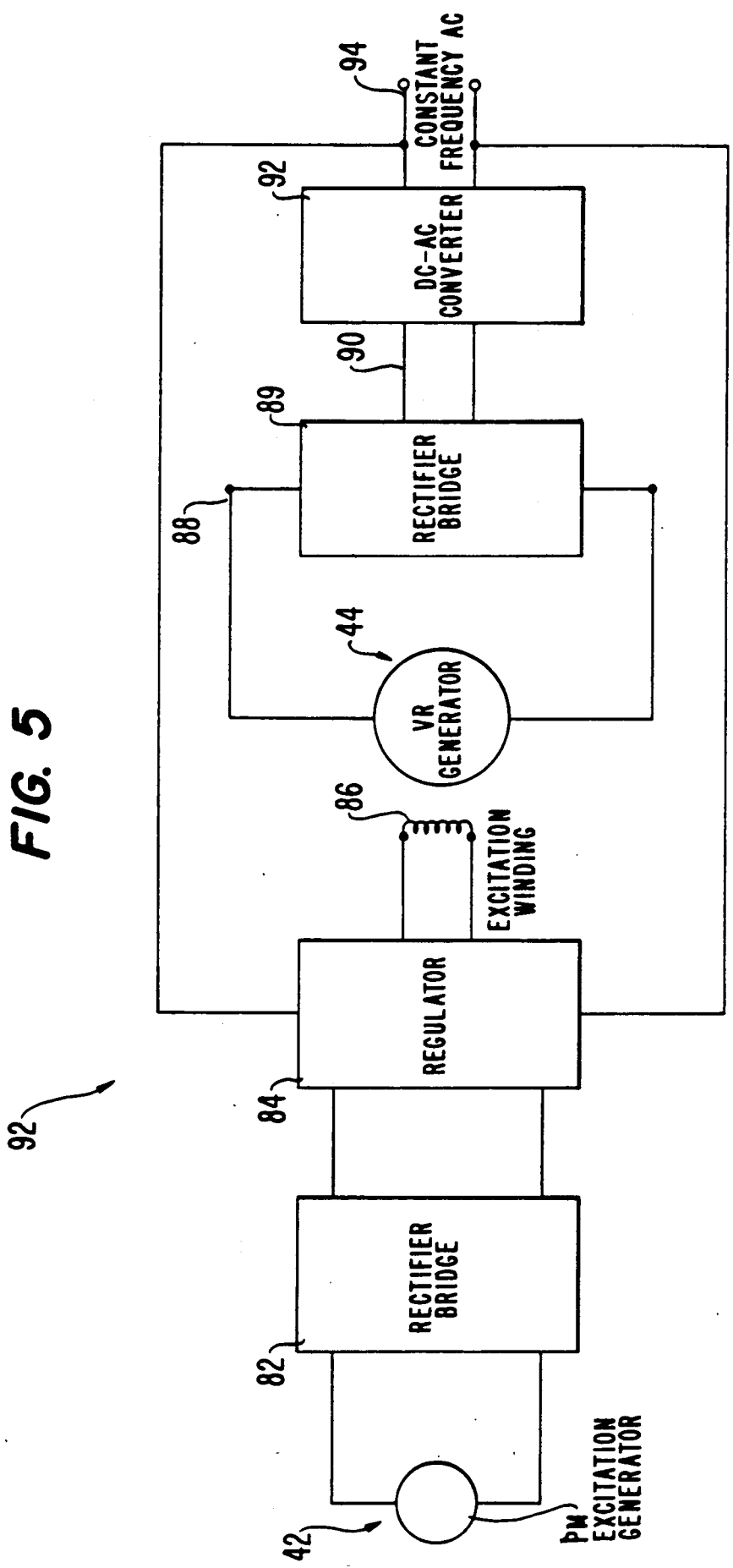
FIG. 5 illustrates a block diagram of a third embodiment of the present invention.

FIG. 2 illustrates an electrical power generating system 40 of the present invention for applications in generating three-phase alternating current in air frames. FIG. 2 does not illustrate the electrical connections of the generating system of the present invention. The electrical power generating system 40 of the present invention contains a permanent magnet generator 42 and a variable reluctance generator 44 having rotors 46 and 48 respectively mounted on a common shaft 50. The design of the variable reluctance generator does not form part of the present invention. Electrical power generating system 40 may be driven by a conventional constant speed drive transmission 52 which converts a variable shaft speed inputted from a power take off 44 which drives shaft 50 at constant shaft speed to cause the generation of three-phase 400 Hz. alternating current by the variable reluctance generator. The electrical power generating system 40 may be contained in an integrated drive generator (IDG) 56 in which the elements are completely contained in a single case or alternatively may be not contained in a single case. A rotor 46 of the permanent magnet generator 42 contains permanent magnets and does not contain rotor windings which weaken the rotor for applications involving high rotational velocities. A configuration of the permanent magnets in the rotor 46 of the permanent magnet generator 42 is conventional and forms no part of the present invention. The stator 58 of the permanent magnet generator 42 contains conventional windings 60 which function to output alternating current for purposes of providing electrical power for exciting the excitation winding (not illustrated) of the variable reluctance generator 44. A rectifier bridge (not illustrated) is connected to the output of the windings 60 for rectifying the current which is applied to the excitation winding by a voltage regulator (not illustrated) as illustrated in FIGS. 3-5 discussed below. The rotor 48 of the variable reluctance generator 44 contains a number of poles differing from the number of poles in the stator windings 64 in the manner conventionally used for variable reluctance generators. As a consequence of the rotor 48 of the variable reluctance generator 44 not having any windings, the rotational velocity of the operating system 40 may be increased over operation velocities used with the prior art of FIG. 1 which typically are 12,000 r.p.m. to a higher velocity which provides a weight savings when the generating capacity is the same such as a VSCF system without causing structural failure. The saving of weight in an electrical power generating system is of great importance in determining the overall operating efficiency in air frames and further lessens problems consequent from mounting the generating system 10 on the air frame propulsion engine such as the aforementioned overhung moment and the space between the case of the engine and its cowling. The stator 58 of the permanent magnet generator 42 and the stator 62 of the variable reluctance generator 44 may be mounted in a suitable cylindrical case 66 if the system is not configured in an integrated case generator.

FIG. 3 illustrates an electrical block diagram of a first embodiment 80 of the present invention utilizing a configuration of FIG. 2. Like reference numerals identify like parts in FIGS. 2 and 3. The AC output of the permanent magnet excitation generator 42 is applied to rectifier bridge 82 which produces rectified DC applied to voltage regulator 84. Voltage regulator 84 functions to vary the excitation current applied to excitation winding 86 of the variable reluctance generator 44 to control the output voltage to produce a regulated three-phase alternating current output.

FIG. 4 illustrates a second embodiment 90 of the present invention which differs from the embodiment of FIG. 3 in that a regulated DC voltage is outputted instead of a regulated AC voltage in FIG. 3. Like reference numerals identify like parts in FIGS. 2-4. The three-phase alternating current outputted by the variable reluctance generator 44 is applied to a rectifier bridge 89 which produces regulated DC on output 90.

FIG. 5 illustrates a third embodiment 92 of the present invention which operates as a VSCF system. Like reference numerals identify like parts in FIGS. 2-5. The embodiment of FIG. 5 differs from the embodiment of FIG. 4 in that the regulated DC current produced on output 90 is applied to an inverter 93 of conventional design for producing three-phase alternating current on output 94.

While the preferred application of the present invention is to multiple phase power generating systems for applications where weight is of particular importance such as air frames, it should be understood that the present invention may be utilized in other fields of application. Furthermore, it should be understood that the present invention is also applicable to single phase systems. Finally, it should be understood that the present invention is not limited to any particular configuration of permanent generator 42 and variable reluctance generator 44 with it being within the scope of the invention to not utilize a permanent magnet generator to generate the excitation current for the variable reluctance generator.

While the invention has been described in terms of its preferred embodiments, it should be understood that numerous modifications may be made thereto without departing from the spirit and scope of the present invention. It is intended that all such modifications fall within the scope of the appended claims.

We claim:

1. An airframe electrical generating system producing an output potential comprising:
   an excitation generator having a rotor mounted on a shaft which is rotatably driven and a stator from which current is outputted;
   a variable reluctance generator having a stator and a rotor mounted on the shaft which is rotatably driven to cause current at the output potential to be generated by the stator of the variable reluctance generator; and
   a voltage regulator, coupled to the excitation generator, to the output potential and to an excitation winding of the variable reluctance generator, for producing excitation current applied to the stator of the variable reluctance generator to regulate the output potential.

2. An electrical generating system in accordance with claim 1 wherein:
   the variable reluctance generator has a plurality of phases outputting multiple phase alternating current.

3. An electrical generating system, in accordance with claim 2 further comprising:
   a constant speed drive transmission having an input coupled to an airframe propulsion engine and an output which provides a constant speed drive to the shaft independent of variation in velocity.

4. An electrical generating system in accordance with claim 3 wherein:
   the variable reluctance generator has three phases and produces three-phase alternating current having a frequency of 400 Hz.

5. An electrical generating system in accordance with claim 3 further comprising:
   a power takeoff having an input coupled to the airframe, propulsion engine and an output which drives the shaft;
   a full wave rectifier coupled to the plurality of phases for producing a rectified DC voltage; and
   an inverter having a DC input, coupled to the full wave rectifier, for producing a multiple phase alternating current on an output having a constant frequency.

6. An electrical generating system in accordance with claim 1 wherein:
   the excitation generator is a permanent magnet generator.

7. An electrical generating system in accordance with claim 2 wherein:
   the excitation generator is a permanent magnet generator.

8. An electrical generating system in accordance with claim 3 wherein:
   the excitation generator is a permanent magnet generator.

9. An electrical generating system in accordance with claim 4 wherein:
   the excitation generator is a permanent magnet generator.

10. An electrical generating system in accordance with claim 5 wherein:
    the excitation generator is a permanent magnet generator.

11. An electrical generating system in accordance with claim 1 further comprising:
    a rectifier having an input, coupled to the stator of the excitation generator and an output, coupled to the voltage regulator, for producing rectified current applied to the voltage regulator.

12. An electrical generating system in accordance with claim 2 further comprising:
    a rectifier having an input, coupled to the stator of the excitation generator and an output, coupled to the voltage regulator, for producing rectified current applied to the voltage regulator.

13. An electrical generating system in accordance with claim 3 further comprising:
    a rectifier having an input, coupled to the stator of the excitation generator and an output, coupled to the voltage regulator, for producing rectified current applied to the voltage regulator.

14. An electrical generating system in accordance with claim 4 further comprising:
    a rectifier having an input, coupled to the stator of the excitation generator and an output, coupled to the voltage regulator, for producing rectified current applied to the voltage regulator.

15. An electrical current generating system in accordance with claim 5 further comprising:
a rectifier having an input, coupled to the stator of the excitation generator and an output, coupled to the voltage regulator, for producing rectified current applied to the voltage regulator.

16. An electrical generating system in accordance with claim 6 further comprising:
a rectifier having an input, coupled to the stator of the excitation generator and an output coupled, to the voltage regulator, for producing rectified current applied to the voltage regulator.

17. An electrical generating system in accordance with claim 7 further comprising:
a rectifier having an input, coupled to the stator of the excitation generator and an output, coupled to the voltage regulator, for producing rectified current applied to the voltage regulator.

18. An electrical generating system in accordance with claim 8 further comprising:
a rectifier having an input, coupled to the stator of the excitation generator for generating current and an output, coupled to the voltage regulator, for producing rectified current applied to the voltage regulator.

19. An electrical generating system in accordance with claim 9 further comprising:
a rectifier having an input, coupled to the stator of the excitation generator for generating current and an output, coupled to the voltage regulator, for producing rectified current applied to the voltage regulator.

20. An electrical generating system in accordance with claim 10 further comprising:
a rectifier having an input, coupled to the stator of the excitation generator for generating current and an output, coupled to the voltage regulator, for producing rectified current applied to the voltage regulator.

21. An airframe electrical generating system for producing a DC output potential comprising:
an excitation generator having a rotor mounted on a shaft which is rotatably driven and a stator from which current is outputted;
a variable reluctance generator having a stator and a rotor mounted on the shaft which is rotatably driven to cause alternating current to be generated by the stator of the variable reluctance generator;
a voltage regulator, coupled to the excitation generator, to the DC output potential, and to an excitation winding of the variable reluctance generator, for producing excitation current applied to the stator of the variable reluctance generator to regulate the DC output potential; and
a full wave rectifier, coupled to the alternating current outputted from the stator to produce the DC output potential.

22. An electrical generating system producing an output potential comprising:
an excitation generator having a rotor mounted on a shaft which is rotatably driven and a stator from which current is outputted;
a variable reluctance generator having a rotor mounted on the shaft which is rotatably driven to cause current to be generated by a stator of the variable reluctance generator; and
a voltage regulator, coupled to the generator, to the output potential, and to an excitation winding of the variable reluctance generator, for producing excitation current applied to the stator of the variable reluctance generator to regulate the output potential.

23. An electrical generating system for producing a DC output potential comprising:
an excitation generator having a rotor mounted on a shaft which is rotatably driven and a stator from which current is outputted;
a variable reluctance generator having a rotor mounted on the shaft which is rotatably driven to cause alternating current to be generated by a stator of the variable reluctance generator;
a voltage regulator, coupled to the excitation generator, to the DC output potential, and to an excitation winding of the variable reluctance generator, for producing excitation current applied to the stator of the variable reluctance generator to regulate the DC output potential; and
a full wave rectifier, coupled to the alternating current outputted from the stator of the variable reluctance generator, for producing the DC output potential.

24. An electrical generating system for producing an AC output potential comprising:
an excitation generator having a rotor mounted on a shaft which is rotatably driven and a stator from which current is outputted;
a variable reluctance generator having a rotor mounted on the shaft which is rotatably driven to cause alternating current to be generated by a stator of the variable reluctance generator;
a voltage regulator, coupled to the excitation generator, to the AC output potential, and to an excitation winding of the variable reluctance generator, for producing excitation current applied to the stator of the variable reluctance generator to regulate the AC output potential;
a full wave rectifier, coupled to the alternating current outputted from the stator of the variable reluctance generator, for producing a DC potential; and
an inverter having a DC input, coupled to the full wave rectifier for receiving the DC potential, for producing current at the AC potential on an output having a constant frequency.

25. An electrical generating system in accordance with claim 24 wherein:
the electrical generating system is an airframe electrical generating system.

* * * * *